(12) United States Patent
Mackey (10) Patent No.: US 6,974,082 B2
(45) Date of Patent: Dec. 13, 2005

(54) HARDWARE INTEGRATION SYSTEM

(75) Inventor: Jonathan T. Mackey, Chagrin Falls, OH (US)

(73) Assignee: Monode Marking Products, Inc., Mentor, OH (US)

(*) Notice: Subject to any disclaimer, the term of this patent is extended or adjusted under 35 U.S.C. 154(b) by 0 days.

(21) Appl. No.: 10/619,293

(22) Filed: Jul. 15, 2003

(65) Prior Publication Data

US 2004/0079803 A1 Apr. 29, 2004

Related U.S. Application Data

(60) Provisional application No. 60/395,904, filed on Jul. 15, 2002.

(51) Int. Cl.[7] .............................................. G06K 7/10
(52) U.S. Cl. ..................... 235/462.01; 235/462.15; 235/432
(58) Field of Search ....................... 235/462.01, 462.15, 235/432; 709/224, 229

(56) References Cited

U.S. PATENT DOCUMENTS

| | | | |
|---|---|---|---|
| 5,287,434 A * | 2/1994 | Bain et al. ............. | 235/462.15 |
| 5,453,933 A | 9/1995 | Wright et al. | |
| 5,559,933 A * | 9/1996 | Boswell .................. | 358/1.15 |
| 5,625,757 A * | 4/1997 | Kageyama et al. ........ | 358/1.14 |
| 5,832,264 A | 11/1998 | Hart et al. | |
| 5,966,126 A | 10/1999 | Szabo | |
| 5,992,752 A * | 11/1999 | Wilz et al. ............. | 235/472.01 |
| 6,059,842 A | 5/2000 | Dumarot et al. | |
| 6,061,709 A | 5/2000 | Bronte | |
| 6,212,574 B1 | 4/2001 | O'Rourke et al. | |
| 6,275,225 B1 | 8/2001 | Rangarajan et al. | |
| 6,370,521 B1 * | 4/2002 | Pigos et al. ..................... | 707/2 |
| 6,486,893 B1 | 11/2002 | Ramchandani et al. | |
| 6,763,382 B1 * | 7/2004 | Balakrishnan et al. ...... | 709/224 |
| 6,868,433 B1 * | 3/2005 | Philyaw ..................... | 709/203 |
| 2002/0149619 A1 | 10/2002 | Sauer | |
| 2003/0048286 A1 | 3/2003 | Lai | |

* cited by examiner

*Primary Examiner*—Diane I. Lee
*Assistant Examiner*—Seung H Lee
(74) *Attorney, Agent, or Firm*—McDonald Hopkins Co., LPA; Robert C. Baraona (57) ABSTRACT

An integrated marking system is described wherein means for marking or encoding information, preferably in the form of a plurality of machines, are linked and controlled in conjunction with means for processing information. Essentially, the means for processing information can be a software program, implemented via a single computer or a computer network. Likewise, the means for linking and controlling the aforementioned machines is possible via the software in conjunction with the same computer or network. Despite the numerous advantages provided by this system, this level of functionality and control was heretofore unseen in the marking industry.

23 Claims, 8 Drawing Sheets

HARDWARE INTEGRATION SYSTEM

FIELD OF INVENTION

This invention relates generally to the field of automated vision or marking systems and, more particularly, to a computer controlled system that is capable of controlling, integrating and tracking the use and actions of various machines involved in a systematic vision and/or marking operation. This application is related to, and claims all statutory benefits of, the Provisional Patent Application Ser. No. 60/395,904 entitled "HARDWARE INTEGRATION SYSTEM" and filed on Jul. 15, 2002.

BACKGROUND OF INVENTION

The encoding, marking and detection of information on various manufactured articles is a useful means for manufacturers to track inventory, maintain quality control and perform other routine functions. In light of recent advances in automated machine vision and marking systems and software, the wide-scale adoption and implementation of such systems has occurred in fields as varied as automotive part manufacturers, clerical operations, retail sales, production of silicon chips/microprocessors and medical and pharmaceutical supplies. As a result, numerous systems and methods for marking, reading and treating encoded information have evolved over the years.

In addition to well-known alpha-numeric representations, numerous other standardized methods for encoding information have been developed. These systems utilize color-contrasting bar codes or data matrices wherein standardized patterns of dots or bars are utilized to represent numbers and/or letters. Many organizations, including but not limited to the Electronics Industry Association, the National Aeronautic and Space Administration, the Air Transportation Association, the Automotive Industry Action Group and Semiconductors' Equipment Manufacturers Institute, have endorsed particular specifications for variations of bar codes or matrices.

Figure 1A:
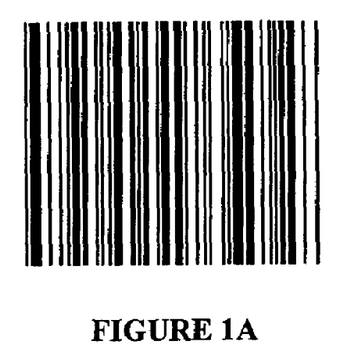
FIGS. 1A–1C depict various forms of linear and two dimensional bar codes for encoding data.

Accordingly, examples of specific linear and two dimensional bar code systems (many of which are part of the public domain or otherwise available for general use) include:

Uniform Symbology Specification Codabar (ANSI/AIM BC3-1995)—A system capable of encoding numeric data by way of start/stop characters, which may be used to convey additional information. FIG. 1A depicts an example of this linear bar code.

Figure 1B:
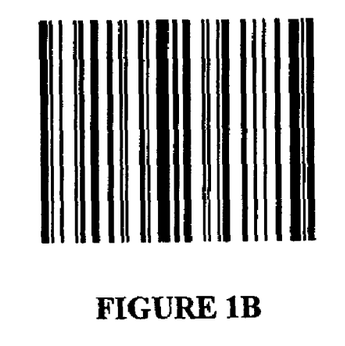

International Symbology Specification Code 128 (ANSI/AIM BC4-1999)—A system which permits encoding of alphanumeric and full ASCII data, along with high information density encodation of numeric data strings. FIG. 1B depicts an example of this linear bar code.

Figure 1C:
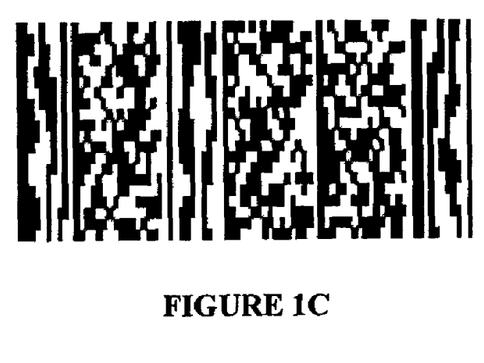

International Symbology Specification MicroPDF417—This system employs multi-row symbology and incorporates a fixed level of error correction for each symbol size. FIG. 1C depicts an example of this two-dimensional bar code.

Figure 2A:
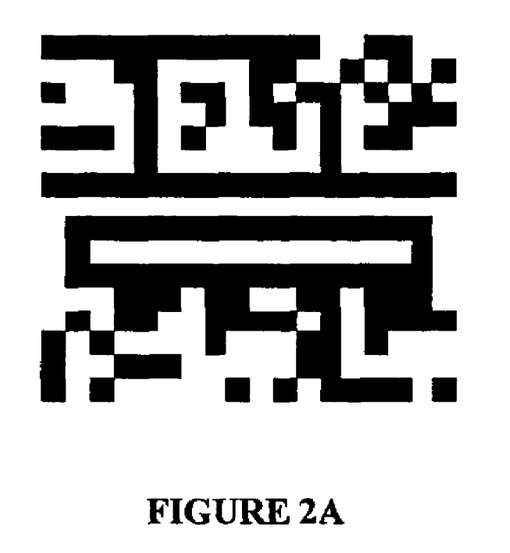
FIGS. 2A–2D depict various forms of two-dimensional matrices for encoding data.

Similarly, two-dimensional matrix systems (many of which are part of the public domain or otherwise available for general use) are also in widespread use. Notably, these systems are particularly helpful in that they can be incorporated on to metal or other non-black-and-white contrast articles, thereby constituting a marked improvement over standard bar code technologies. Such two-dimensional (2D) matrix systems include:

Uniform Symbology Specification Code One—This system utilizes dark and light square data modules, along with a finder pattern of parallel lines within the interior of the symbol. It is designed for a fixed level of error correction, conforms to standard escape sequences and code pages and can be used for large data file encoding and small item marking. FIG. 2A shows an example of this two-dimensional matrix.

Figure 2B:
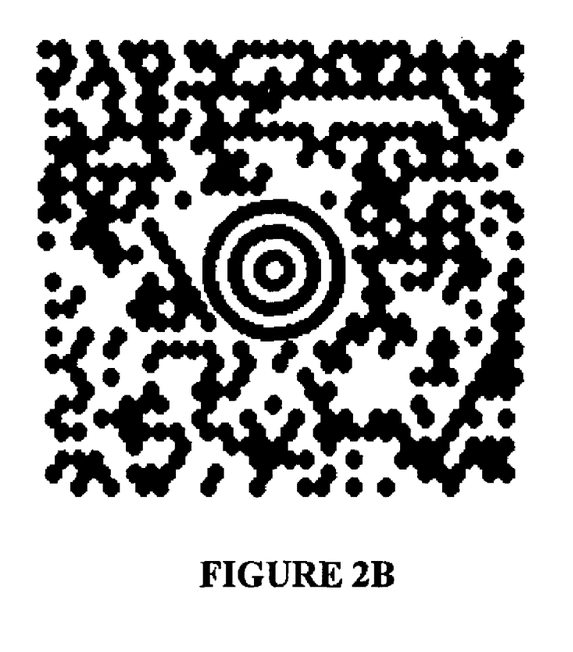

International Symbology Specification Maxicode (ANSI/AIM BC10)—This system utilizes a fixed-size symbol containing dark and light hexagonal modules and a bulls eye finder pattern. It also includes two selectable levels of error correction and conforms to standard escape sequences and code pages. FIG. 2B depicts an example of this two-dimensional matrix.

Figure 2C:
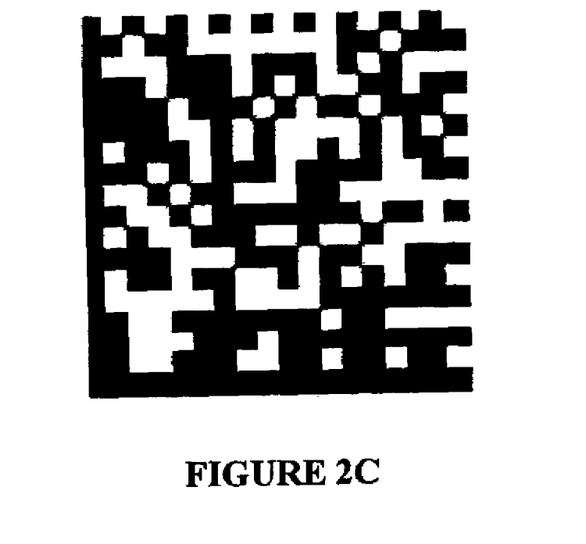

International Symbology Specification Data Matrix (ANSI/AIM BC11)—This system utilizes dark and light square modules in conjunction with a finder pattern along the perimeter of the symbol. It permits error correction, conforms to standard escape sequences and code pages and can be used for small marking applications in a wide variety of printing and marking technologies. An example of this two dimensional matrix is shown in FIG. 2C. Additional information on this system can be discerned from U.S. Pat. No. 4,939,354 which is hereby incorporated by reference.

Figure 2D:
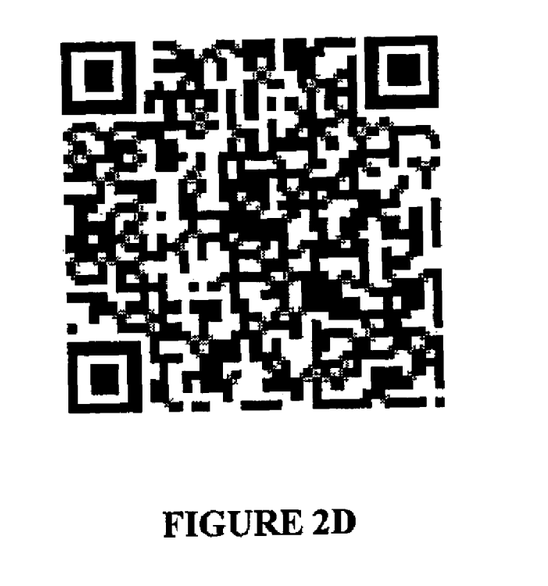

International Symbology Specification OR Code (AIM ITS/9/001)—This system uses dark and light square modules with a finder pattern in three of its four corners. It contains selectable levels of error correction, possesses capability for encoding Japanese Kana-Kanji characters and conforms to standard escape sequences and code pages. It finds utility in small marking applications for a wide variety of printing and marking technologies. FIG. 2D depicts an example of this two dimensional matrix. Additional information on this system can be discerned from U.S. Pat. No. 5,726,435 which is hereby incorporated by reference.

As will be readily appreciated by those skilled in the art, various other systems exist. Reference can be made to the Association for Automatic Data Identification and Data Capture Technologies (http://www.aimglobal.org/) or other similar organizations in order to determine the complete extent and nature of these systems. Significantly, to the extent that new variations of these systems are continually conceived or updated, it should be understood that the invention described below is equally applicable to any encoding system, whether a new system, one that is described above or known in the art and/or any updated versions thereof. Likewise, the invention described below will have equal applicability to traditional alpha-numeric representations utilizing virtually any known alphabet or numbering system (e.g., Latin character set, Cyrillic character set, Arabic numerals, binary code, etc.).

In response to the development of bar codes and matrix systems, a wide variety of machines have been developed both to create and read such encoded information (herein referred to as marking and vision machines, respectively). Examples of machines capable of reading and marking such information on articles include a wide variety of imagers, vision boards, hand-held scanners, fixed vision cameras, optical readers, charged coupled devices and other similar apparati, and a few exemplary references, all of which are incorporated by reference, include: U.S. Pat. Nos. 5,550,363; 5,614,704; 5,790,715; 6,302,329 and 6,508,404. Additionally, marking machines can be as varied as laser or ink-jet printers, pin-marking machines, micro mills, devices for etching, lasers and the like.

Not surprisingly, the proliferation of different marking machines has made compatibility of disparate systems a key concern for those involved in the vision and marking fields. Each machine possesses its own interface and user instructions which, often times, may be distinct from the other machines utilized in the operation. This is especially true in applications where both vision and marking operations are utilized. To date, industry practice in the field of automated marking machines has been to provide individual dedicated machines, both as a matter of simplicity (insofar as manufacturers of these machines are relieved from the substantial burden of developing an integration system) and perhaps as a matter of profitability (insofar as there is an arguable advantage to being able to sell completely new machines to the marking industry, rather than less expensive integration systems). Whatever the case, industry has not yet adopted universal software standards or operational specifications for communication between differing machines, and particularly with respect to the integration of vision and marking systems.

Even though an industry standard for integration does not yet exist, various computer applications have attempted, with limited success, to optimize particular functional aspects of these marking machines. Because these applications and programs are often linked to inventory, sales records, physical document locations or other critical functions, separate software systems have been developed to maintain detailed, auditable records of how operators use these machines. Additionally, yet other computer applications have been developed to transport and manage the data and audit records across a computer network and/or to an external archiving location (many of these programs and/or machines are themselves linked to such networks). To date, no single application exists to integrate and manage all of these disparate elements, in all likelihood for the exact same reasons that manufacturers of the marking and vision machines have not made any serious attempts to standardize their machines.

Not surprisingly, this multiplicity of software applications and machines creates problems for the vision and marking industry insofar as many of the applications and machines best suited to particular application are simply not compatible with one another, thereby forcing the user to implement multiple computer systems and/or become well versed in the use of multiple applications/machines (resulting in poor resource utilization). Moreover, the separate training for each application/machine that is required for operators utilizing the system results in expense and time consuming training. Yet even more difficulties are encountered when these varying applications are linked to a computerized network for the purposes of archiving the data and audit logs created by some applications.

In short, a single computer application which integrates and coordinates the operation of such vision/marking machines and the various software applications associated therewith has not been created to date. A software application which provides a single user interface to coordinate and control the various machines involved in the generation, application, reading and data management and transport across a computer network of encoded information (namely in the form of traditional alpha-numeric, linear and two-dimensional bar codes and/or two-dimensional matrices) would be welcomed by the industry. Moreover, a software application which permitted auditable tracking of an operator's use of such machines, along with the concurrent capability to transport across a computerized network and maintain an external, auditable log of the data generated thereby, is also needed. Finally, a system which generally simplifies the use of vision and/or marking machines, their related software and their associated auditing and tracking features, without the need for sophisticated training for the operator or time consuming procedures developed only for a specific configuration of machines, would be similarly well-received.

SUMMARY OF INVENTION

The present invention solves the aforementioned problems and others by providing a software system for integrating the operation of a plurality of vision and/or marking within a system. The software system selectively links the machines to a user interface, and the interface or the elements of the vision/marking system itself provide a series of inputs to the software. In turn, the software processes these inputs and generates a desired output. Finally, the software controls the appropriate elements of the vision/marking system in a manner that is consistent with the inputs and/or outputs (ultimately, the nature of the inputs and outputs will be determinative of the nature and extent of the control).

The present invention also contemplates a system for selectively controlling at least one vision or marking machine. This particular system includes means for identifying an input from the machine (whether such input is generated by the machine itself or in the form of a user prompting the machine to provide the input), processing the input to generate a desired output, controlling the machine in a manner that is consistent with the output and generating a historical record of the performance of the system.

Additional functions and features for the embodiments of the invention are described in greater detail below. While particularized examples are given for the sake of clarity, it should be understood that the description of the invention, and the claims appended to this application, expressly encompass all the variations and functional equivalents of these additional functions and features.

DETAILED DESCRIPTION OF THE INVENTION

As its goals, the present invention seeks to provide a unitary method and system for controlling disparate machines within a vision and/or marking system. Often, these machines are made by different manufacturers and/or rely upon different hardware and software systems during operation. Thus, the present invention solves the aforementioned compatibility problems between those systems. At the same time, the present invention is structured in such a way as to permit recognition and incorporation of virtually any model or manufacture of a marking machine without the need for rewriting or generating new computer code and without the need to continually revise or account for changes to the particular machines within the system.

Additionally, the present invention allows for administrative controls by a single entity across a marking system which may have multiple user operators (these operators being linked to the system via a single terminal or a network of individual work stations). These controls permit a single user-administrator to perform any of the following basic functions (all of which will be described in greater detail below): creating and modifying any number of user-operator interfaces in order to restrict a particular operator's use of the system (referred to as the Grey Screen and Grey Screen Designer); logging activity of each user-operator accessing the system and establishing and enforcing security parameters accordingly; and/or broadcasting data, audio or video transmissions to each user-operator's control panel. The implementation of these controls may also include a specialized graphical interface for the user-administrator so as to simplify the creation and management of the profiles. Notably, these controls are implemented within the existing framework of the network required to control the disparate vision and/or marking machines, so as to provide the user-administrator with a single, standardized control and interface.

The actual user-operator of the system is similarly afforded with a single interface (selectively created and controlled by the user-administrator) to communicate with and control any and every machine within the system to which that particular user has been granted access by the administrator. The user-operator may: create and modify universal templates related to operational parameters or inputs required by a plurality of machines in the system, which are applied according to those machines after being appropriately recognized and processed by the software; remotely operate the machines in the system, including providing particularized instructions with respect to certain functions in order to compensate for the method of marking (e.g., if the user is utilizing an etching machine to mark a 2D matrix, the software selectively or automatically modifies the marking instructions sent to that etching machine so as to account for the expansion of etch material upon the article itself); efficiently manipulate information that is to be encoded and marked on an article by automatically translating the information into whatever encoding system the user selects; similarly understand and manipulate encoded information that has been read from an article by selectively or automatically recognizing the encoding system and translating the encoded information into a more understandable format; combine, incorporate and/or export data to or from an external database into the marking/reading operation (discussed in greater detail below); and track and generate reports concerning operational data of the system or particular machines in the system, a log of user actions taken and/or detailed information concerning the encoded information which has been read or marked on the articles being handled by the system.

In the instance of controls and functions afforded to the user-administrator and the user-operator, it should be understood that the particular items identified above are believed to be of particular applicability to the marking industry. Nevertheless, it is possible to provide additional features without departing from the principles of this invention. As such, the invention is specifically intended to cover any functionality which increases productivity, security or utility of an integrated hardware vision or marking system.

As alluded to above, data management is another key element of this invention. Because all of the machines in a system are linked, controlled and monitored by a single software application, the application itself can be designed to automatically log and track historical performance data, in terms of operation of the machine(s), actions taken by the user(s) and/or the actual encoded information being read or marked on the articles handled by the system itself. This data can then be incorporated into the aforementioned reports. The data can also be exported to external data storage systems, via a computerized network, so as to create audit logs, archives and/or back-up copies of the data. The utilization of external data storage is particularly important for instances in which the user needs to re-install or verify data because of difficulties encountered on the user's local installation or network (e.g., a local installation which has crashed or been compromised by way of a security breach can be restored through the use of external data storage).

Likewise, the seamless incorporation or utilization of data into the operation of a marking system is also possible using the present invention. For example, the present invention permits users to selectively link databases to the system. In practice, the information is automatically transferred to or from the database (depending upon the user's instructions). This functionality permits the system to automatically generate items such as creation dates (also referred to as the "born on" dates), serial numbers, product information, user-created fields of information and numerous other identifiers that will be readily understood and adopted by the user. By the same token, in a reading operation, the present invention permits a plurality of disparate reading machines to have information obtained therefrom automatically transferred into a database selected by the user.

Because the present invention is capable of functioning across a computerized network (in addition to being installed on a single CPU), it is possible to install and provide support for users relying upon that same network. This functionality should be particularly important with respect to installations and service provided over the internet or world-wide web. Relying upon known programming techniques related to incremental data downloads using a computer code such as Active X (thereby permitting the function to occur in several different user sessions, if needed), the present invention selectively and/or automatically communicates with a centralized computer system maintained by the software provider in order to allow user registrations, to perform a software integrity checks (thereby insuring that the installation is current), to install or update software, to backup data and system configuration information, to re-install software and to report errors and debug the software. To date, it is believed that no other marking system or marking system software provides its users with such capabilities and that, as such, the present invention fulfills a long-standing need within the industry.

As mentioned previously, the present invention is applicable to virtually any system of encoding information (i.e., alpha-numeric, linear or two dimensional bar code, two dimensional matrix or otherwise). To the extent that new variations of these systems are continually conceived or updated, it should be understood that the invention described below is equally applicable to any encoding system, whether a new system, one that is described above or known in the art and/or any updated versions thereof. Likewise, the invention described below will have equal applicability to traditional alpha-numeric representations utilizing virtually any known alphabet or numbering system (e.g., Latin character set, Cyrillic character set, Arabic numerals, binary code, etc.).

The present invention utilizes object-oriented programming techniques to implement the goals and purposes described herein. In particular, the invention utilizes a specially developed software kernel, coupled with a unique graphic user interface, to accomplish these goals. Significantly, while object-oriented techniques and kernel drivers are generally understood in the art, the inventor is unaware of any attempts to date to provide the functionality and/or other capabilities for the integration of hardware found in common marking systems as is described herein. Furthermore, while hardware marking systems are used as an exemplary model, it should be understood that certain aspects of this invention, including the coordination and export of data, may be applicable to a wider range of potential uses.

The invention is particularly well-suited to implementation by way of XML or Active X programming code. Nevertheless, any code may be utilized. In selecting a particular programming code, the size of instructions and data packets being sent over the computerized network will be a particular concern. Additionally, a code that is compatible with a wide variety of operating systems and marking machine outputs is best suited to the present invention.

Notably, the present invention may require user-implemented protocols to properly incorporate new hardware into the system, prior to the user being able to link that hardware into the system itself. These protocols are a series of standardized instructions which help the user to provide the proper inputs and configuration for the software so as to permit that software to detect the hardware being added. In essence, these protocols are similar to the "set-up wizards" commonly found in other commercial software in that they simply comprise a systematic series of written questions and answers which aid in determining the particular operating system or software structure of the machine. This determination is particularly relevant for many older machines, which rely upon outmoded and essentially obsolete computer codes or chips which are not readily compatible with the code of the present invention. Once the nature of the chip/software in the machine to be added to the system is determined, the user configures the software accordingly. Operatively, the software code constituting the present invention includes portions of code which essentially mimic these older systems, thereby affording the present invention even greater compatibility and, as a result, functionality to the extent other marking systems require separate or non-unitary control.

By way of example, the software of this invention is designed to function seamless in Microsoft's Windows® operating system (although the invention can be modified to operate on other similar platforms). Many of the dedicated marking and reading machines contemplated by this invention actually utilize programmable logic circuits with customized input/output circuitry. Likewise, although most computers today rely upon 32-bit software applications, the machines used in the marking industry may rely upon older, slower software applications. The invention (by way of its protocols) recognizes all of the various nuances in each machine, and then provides the end-user (either an operator or an administrator) with a singular interface, having standardized commands and functions, which links and controls all of these disparate machines. This "handshaking" is accomplished through the utilization of various DLL protocols, as will be understood by those skilled in the art of programming. Individual DLL protocols are established as needed to facilitate communication between the computer running the software of the present invention and the machines being controlled by it.

Particular attention must be paid to the organization and hierarchical structure of the software code itself. A programmer utilizing this invention must insure that a coherent, efficient and readily adaptable file structure is established so that the software is capable of quickly and readily searching and sorting through the files of the computer(s) linked to the system (whether those computers are associated with the software of the present invention, the various user-operator panels, the database system, the data storage system or the marking and reading machines themselves) in order to identify the necessary drivers and DLL protocols.

Artificial intelligence principles may also be utilized to assist in the processing of encoded information by the software. In particular, a programmer implementing the present invention may choose to afford the software with the ability to detect certain trends or patterns and apply those detected trends/patterns to new situations. In doing so, the software will operate more efficiently and with less need for user-operator or user-administrator prompting or intervention.

Commonly encountered graphical user interface techniques may be incorporated into the software so as to provide the user with a familiar and standardized means for interacting with the invention. In particular, features such as multiple select, drag and drop icons, what-you-see-is-what-you-get methodology, activation/short keys, Windows® Common Object Model interface protocols and other similar types of standard features can be utilized to implement the functions which comprise the invention, so as to enhance and simplify the user's experience.

Figure 3:
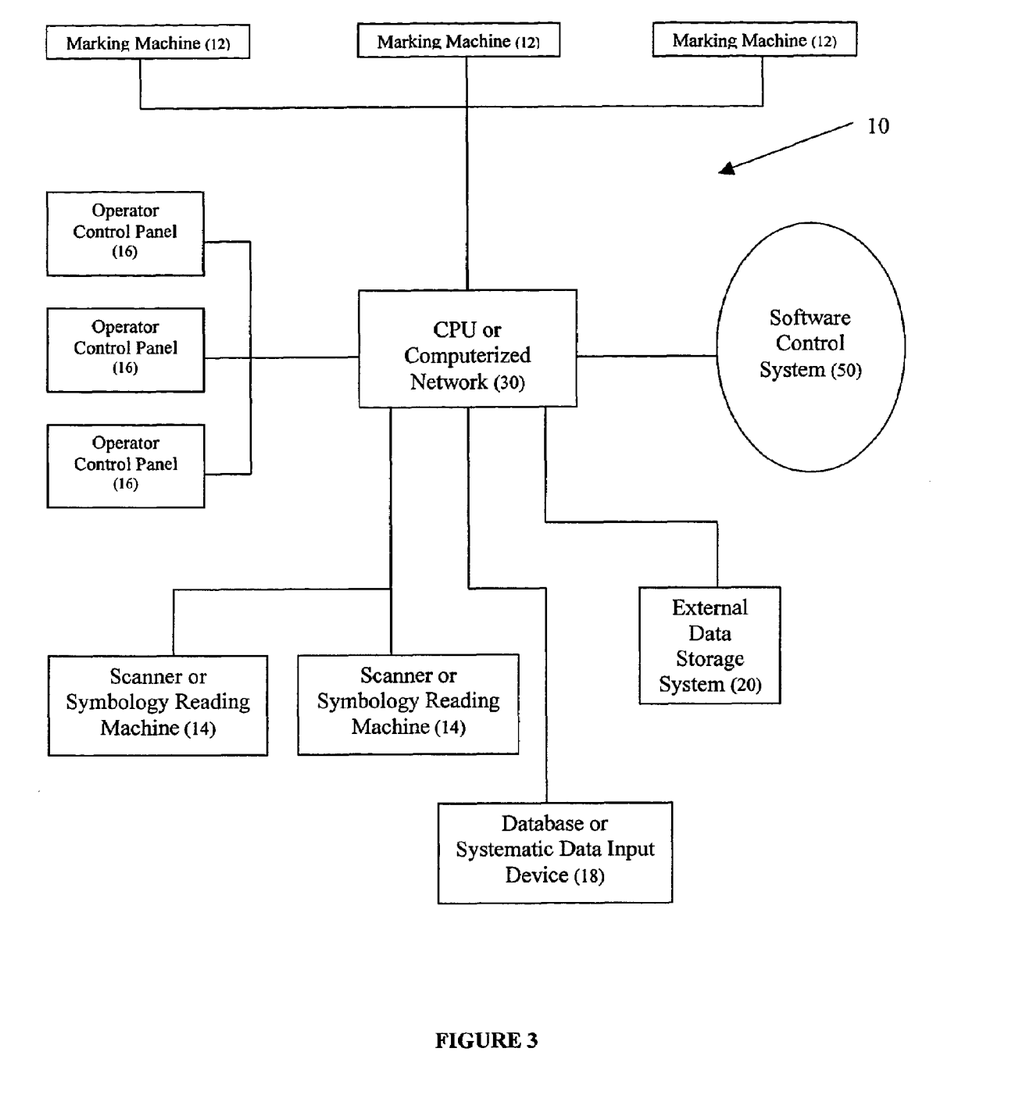
FIG. 3 depicts the physical elements of a marking system which can be controlled by the present invention, along with how these elements are linked together.

The elements of a typical marking system, along with a generalized representation of the present invention, are shown in FIG. 3. Marking system 10 comprises one or more marking machines 12. Scanner or symbology reading device or devices 14 may be provided in addition to, or in place of, marking machines 12. The particular types of machines 12 and devices 14 are enumerated above and incorporated herein by reference, although it should be understood that the present invention encompasses any similar type of reading or marking means known in the industry.

At least one operator control panel 16 is also included in the system. This control panel can be a dedicated set of input and output devices, including buttons, mouse-like pointers, touch screens or other such implements (including some of the aforementioned graphical user interface techniques). The panel 16 itself permits an operator to selectively utilize any or all of the machines and devices 12, 14 in the system 10. This utilization is effected by way of a single CPU or computerized network 30. Notably, the term network specifically includes a local area network, a wide area network or the world-wide web. Also, while the term "computer" is generally used, it should be understood that this computer relies upon the particularized instructions and controls of the software control system 50 of the present invention, described below and readily understood as an integral element of this invention.

Software control system 50 may be installed locally or via the network 30. The software control system comprises computer code which is specifically written to implement the functions mentioned above. Those skilled in the art should be able to select the appropriate code and language according to the principles discussed above.

Database 18 can be incorporated into the system, either on the same computer as the software control or as a separate, networked system. The possible uses of such a database have been described above.

In contrast to database 18, external data storage system 20 must be connected via network 30. The advantages of such an external system have been described above.

Figure 4:
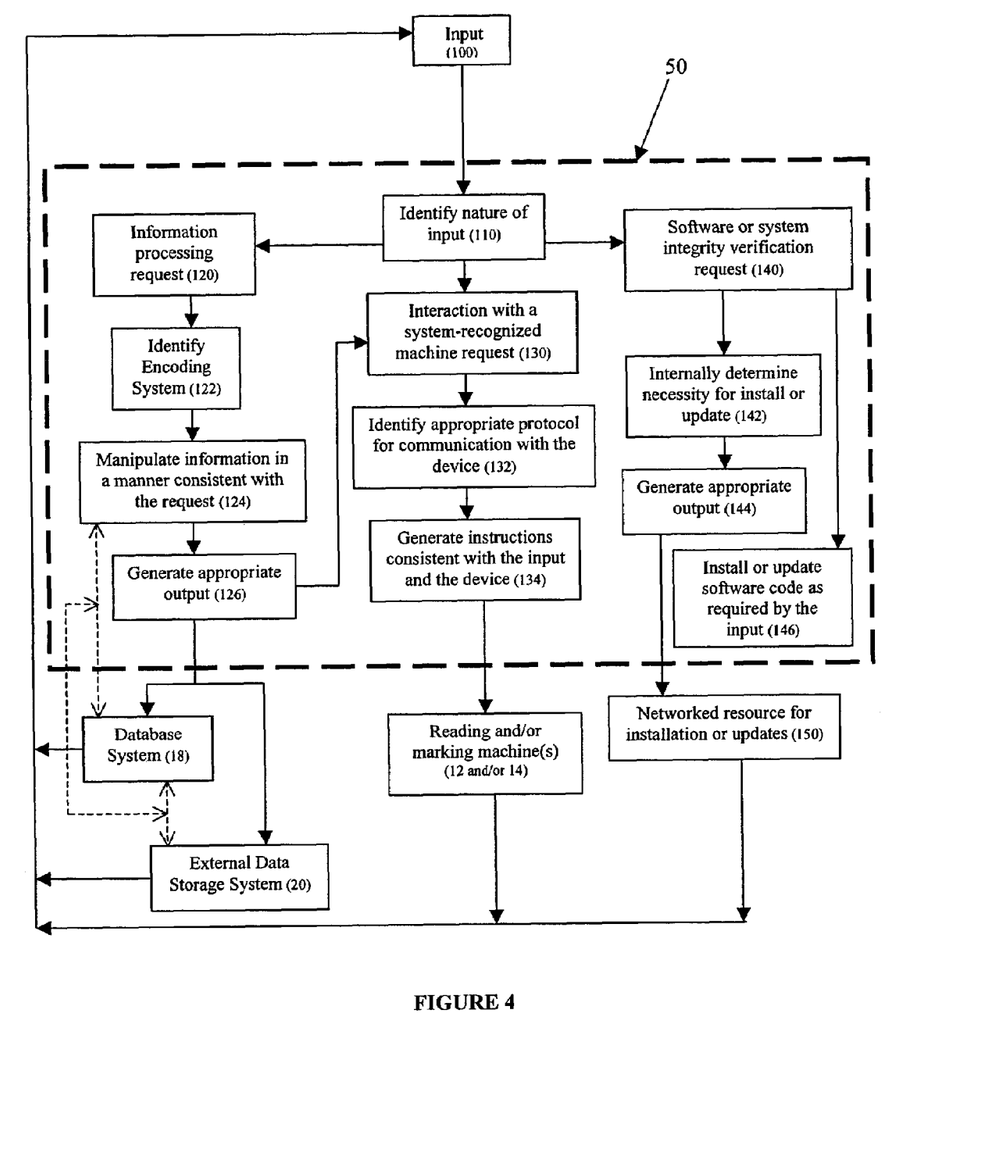
FIG. 4 is a functional diagram showing how the various elements of the present invention interact.

FIG. 4 shows the functional relationship of the elements of the present invention. Input 100 is provided to software system 50. As will be described in greater detail below, input 100 can be a user-operator defined variable, a user-administrator defined variable or data that is provided from an external source (i.e., a computer network, a machine within the marking system 10, a database 18 or a dedicated external data storage system 20). To the extent that these inputs 100 may actually be present in the system 10 itself, the input 100 may be self-generated and completely transparent to a user-operator or user-administrator, although it should be understood that not all inputs 100 must be self-generated.

The software system identifies the nature of the request 110 and responds accordingly. If the input 100 relates to information processing, the software handles the input according to the information processing request protocol 120. In contrast, if the input relates to a request to interact with one or more specific pieces of hardware within the system, the second protocol 130 is followed. As a third option, the software may recognize and deal with the input 100 as a request for a software or system integrity check 140. Each of these protocols 120, 130, 140 will be dealt with separately below.

Information processing request 120 can constitute any number of functions related to the marking operation. Most likely, it will be a request to encode or translate a specific input (i.e., encoded information read from or marked to an article being handled by the marking system 10, a user-defined piece of information, etc.); to create, modify or apply a user-operator template, security setting or other administrative control (as discussed above); to bind or incorporate data from a database 18 or external data storage system 20; to generate a report based on certain parameters (i.e., system performance, activities of users, activities of machines, etc.); and/or to mark or read a specific piece of information to or from a machine in the marking system 10. A key step in acting upon request 120 is to identify the encoding system (if any) in question, as represented by protocol 122. Depending upon the nature of the request 120, the software system 50 will implement an appropriate application, subroutine, algorithm or other protocol to manipulate the information in a manner consistent with the input 124, thereby generating an appropriate output 126. This manipulation step 124 may optionally include a data binding or other exchange of information between database 18 and/or data storage system 20 (as shown by the dashed-line arrows present in FIG. 4), although the code of software system 50 itself may be written so as to internally contain all necessary algorithms, data or other transformative steps without the need for database 18 or external data 20. Also, it is possible, but not necessary, for database system 18 to be externally linked to the data storage means 20. Output 126 may take the form of actual instructions or interaction with a machine within the system 130, information sent into database 18 (note that this step is different from the data binding operation represented by the dashed-line) and/or information sent to an external data storage system 20.

Machine interaction protocol 130 enables the user to selectively control any machine 12, 14 that is linked to the system. To the extent that a machine 12, 14 can provide the input 100, it should be understood that this type of input, in fact, represents the present invention's ability to recognize and interact with marking machines 12, 14 made by a wide variety of manufacturers and for a wide variety of marking applications. The specific machines contemplated by this invention were previously enumerated above.

As a key step in machine interaction protocol 130, the software identifies the appropriate means of communicating with the device in question, as represented by step 132. As mentioned above, this means may be a DLL protocol or other similar means (i.e., an application, a subroutine, appropriate plug-in file, algorithm or other protocol). In turn, the software then generates an appropriate command so as to implement the interaction request 130. Ultimately, the specific form of identification step, as well as instruction generating step 134, will vary with, and be determined by, the precise configuration and content of the system 10. As noted above, the machine 12, 14 itself may then generate a separate input 100 for the system 50.

Software or system integrity verification request 140 is yet another novel aspect of the present invention. The software system may automatically perform such requests on a predetermined basis through the inclusion of appropriate protocols in the software code itself. Alternatively or additionally, a user may provide an input to prompt system 50 to perform such a verification. Essentially, verification request 140 will either cause the system to determine the necessity obtaining a particular install or update 142 and then generating an appropriate output in response thereto 144. Typically, this output 144 will be a request transmitted over a computerized network transmitted to an external resource 150 to provide further updated data inputs for the system 50. In the event such updated data inputs are provided, the software system 50 may actually update its internal parameters or code as required by that input, as shown in step 146.

Figure 5:
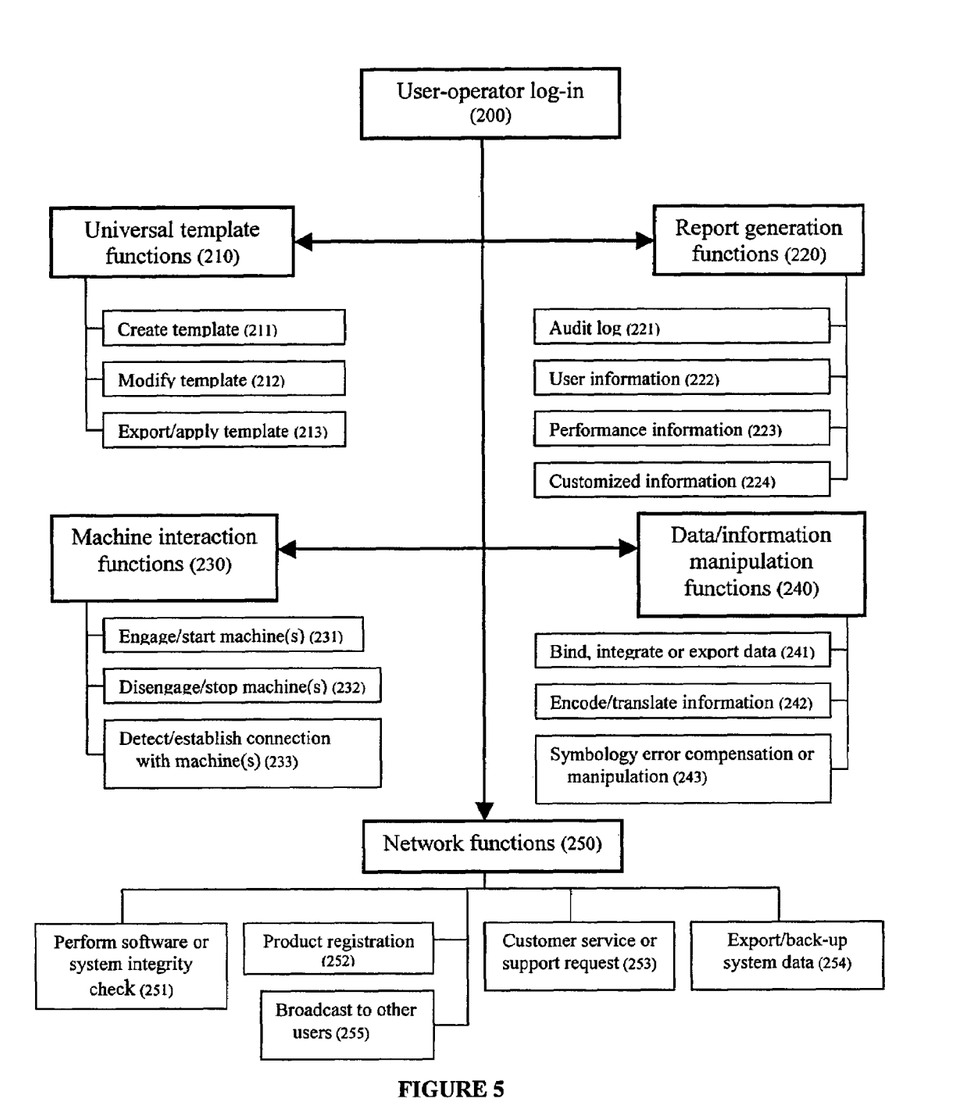
FIG. 5 is a flowchart showing the options and functions available to a user-operator of the present invention.

The particularized options and choices encountered by a user-operator are depicted in the flowchart of FIG. 5. Notably, the options listed in FIG. 5 are intended to be exemplary, rather than exhaustive. Enumeration of these functions should further assist the programmer in implementing the present invention, although it will be readily understood that the categories or specific options listed in FIG. 5 do not necessarily represent discrete and separate portions of software code. Instead, as is common in object-oriented software, some of these functions may include or build off others. Ultimately, FIG. 5 is intended to aid the programmer rather than represent a hierarchy or narrowly defined program structure.

Essentially, the options and functions available to a user-operator can be generically categorized as follows: template functions 210, report generation functions 220, machine interaction functions 230, data or information manipulation functions 240 and network functions 250. Other functions which further aide in the integration of marking systems may be possible. By the same token, it should be understood that the means and steps enumerated in the claims below can encompass any one of the function or functions contemplated by this paragraph. Also, as an added security feature, the user-operator may only access these functions after completing log-in operation 200.

A user-operator may create templates 211, modify templates 212 or export and apply templates 213. In practice, templates constitute subsets of information that can be utilized or sent to the various machines 12, 14 which constitute marking, system 10. As part of the modification process, the user can implement a "step and repeat" feature in order to copy and paste set patterns into a region of that template. Also, it should be understood that these templates may be relied upon any number of the other user-operator functions identified herein. In particular, the software system 50 may refer back to any one or more of these user-operator created templates to establish default settings for other templates or outputs generated by the system 50.

Figure 6:
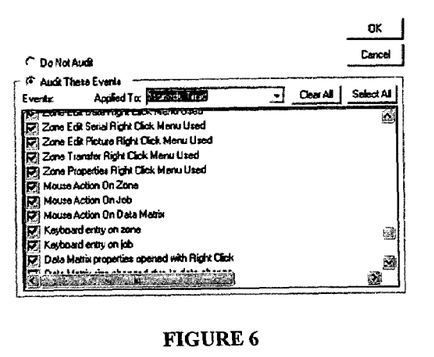
FIG. 6 is an exemplary depiction of audit log report generated by the present invention.
Figure 7:
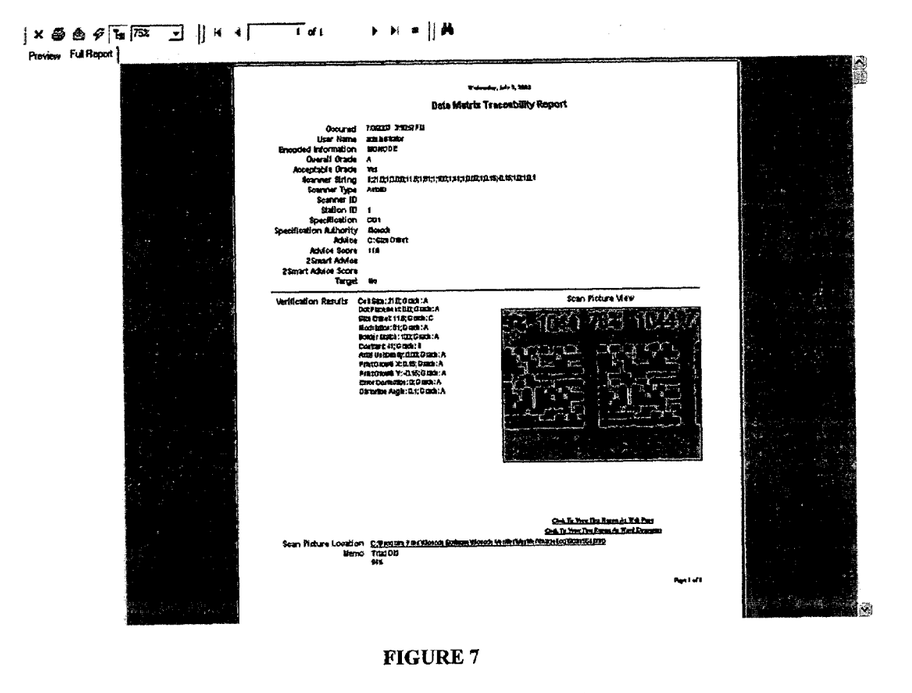
FIG. 7 is an exemplary depiction of a report generated by the present invention.

Report generation functions 220 all rely upon the historical and performance data that is generated, monitored and/or logged by software system 50. Audit logs 221 relate to the historical or archival information. User information 222 can include reports on user activity. Performance reports 223 include data on the performance of the entire marking system 10 and/or particular machines 12, 14 in the system. Customized information reports 224 are defined through an interactive process by the user and can include virtually any subset of information or data linked to the system. In each instance, the software system 50 will automatically retrieve and incorporate the necessary information or data from the appropriate elements of the entire system 10 (for example, to the extent external data storage system 20 might be utilized, the software system 50 will be programmed to recognize and retrieve data therefrom). FIG. 6 shows a graphical user interface that may be used to generate reports, whereas FIG. 7 represents a preferred screen image/presentations of such a report.

Machine interaction functions 230 rely upon and implement plug-in files or other protocols associated with communicating with the individual machines 12, 14 linked to the system 10. To the extent that these functions represent a key element of the invention, those familiar with the marking industry will readily recognize the unique and powerful operations that can be accomplished by these functions. In particular, a user-operator may engage or start a machine or any particular set of machines 231 and/or similarly disengage or stop a machine or set of machines 232. Additionally, the user-operator can institute the protocol to detect and/or establish a connection with a machine or set of machines that are appropriately linked to the system 233.

Data and information manipulation functions 240 embody a wide range of functionality, and as with the aforementioned machine interaction options, the integration of these data-handling options across the entire system 10 is unique to the present invention. A user-operator may bind, integrate, import or export data 241 from a database or external data storage device (clearly, this operation may also require use of the machine interaction functionality). This set of options also includes the selective ability to encode or translate any encoded information system 242 and to review and further manipulate those results in real-time through interaction with the user-operator control panel 16. Again, to the extent that function 242 requires additional user-operator functionality, such functions are an inherent part of step 242. A final and unique feature 243 of software system 50 is its ability to permit the user, through control panel 16, to manipulate the symbology (encoded or otherwise) and to customize instructions to insure that symbology is accurately read or marked by machines 12, 14. The manipulation may include control of character attributes or spacing; error compensation features; zone styles; zone cloning; live camera set up (in order to permit the operator to view a particular machine, or article for marking by that machine, within the control panel 16 itself); establishing user-defined grading scales related to particular features or parameters of an operation, along with the optional ability to view and export real-time results; and corresponding functions for any two-dimensional symbology created thereby (i.e., 2D matrix growth compensation/control, 2D zone data binding, etc.).

The network functions 250 represent yet another advance by the present invention in comparison to the prior art. The software to implement these functions can include the use of data encryption, check-sums and incremental data downloading in order to ensure the integrity of operations carried out over any computer network (be it local area, wide area or internet/world-wide web based). In particular, the user-operator may request a software or system integrity check 251. Product registration 252 and customer service or support 253 are also possible. A significant advantage is the user-operator's selective ability to perform export of data 254 to a legacy system, such as a back-up data storage system. Finally, the network functions include the ability to broadcast data, audio or video transmissions to other users 255 within the system 10 (and particularly, to other user-operator interfaces/control panels and/or to the administrator's interface/control panel). As with many of the functions above, function 255 may require additional functions from other subgroups.

Figure 8:
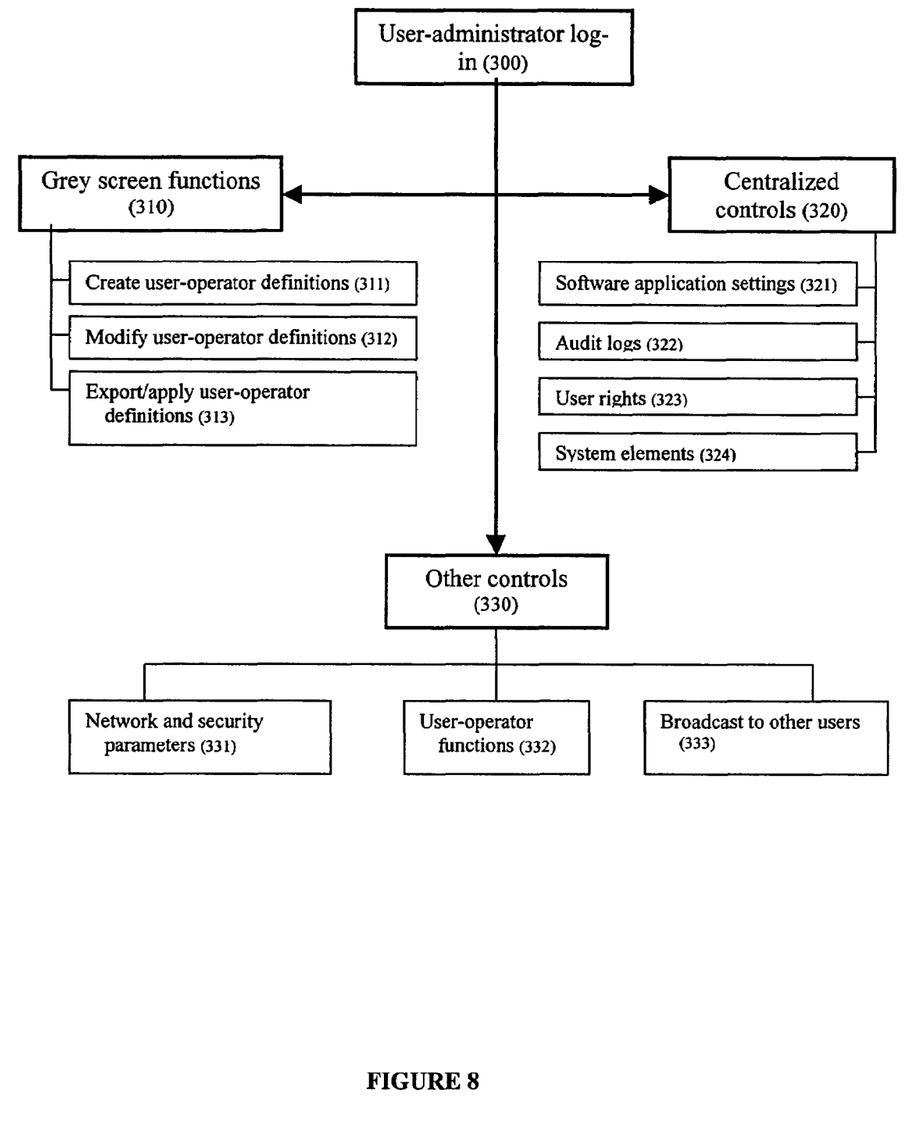
FIG. 8 is a flowchart showing the options and functions available to a user-administrator of the present invention.

Examples of the type of controls that may be included in software system 50 and selectively exercised by a user-administrator are shown in FIG. 8. As with the user-operator functions, access to the user-administrator functions can be secured and controlled by user-administrator log-in feature 300.

The most preferable user-administrator functions include those referred to as Gray Screen functions 310, centralized controls 320 and a generic categorization of other controls 330. As before, this list is merely exemplary, and those skilled in the art may other functions which would be attractive to an administrator of an integrated marking system without departing from the principles of this invention.

Gray Screen functions 310 provide the user-administrator with the ability to establish separate, customized user-operator interfaces. To the extent that these user-operator interfaces are the point of contact for that user-operator, it should be apparent that the user-administrator can exercise considerable control over access and utilization of the system by way of functions 310. Function 311 permits the creation of an unlimited number of interfaces, each having specific functions associated with and designated for a particular user-operator. Function 311 also includes the ability to replicate a particular type of screen for multiple user-operators. Modify user-operator definitions 312 permits alteration of such "grey screens," whereas export/apply user-operator definitions 313 results in the publication/dissemination of those screens to the persons using marking system 10 and, more particularly, software control system 50.

Other centralized controls 320 are also provided, so as to permit universally implemented changes to the entire system 10. For example, a user-administrator may selectively alter, on a universal or ad hoc basis, any subservient software applications 321 linked to the software control system 50. Similar control may be exercised with respect viewing, creation, modification or implementation of particular audit logs 322, user rights profiles 323 and system elements 324. Any of these controls can either be standardized as an intrinsic part of the software code or generated by interaction with the software system 50 on the basis of user-administrator defined parameters. In sum, a single user-administrator can effectively control the settings and parameters associated with any portion or element in the system 10.

Similarly, the user-operator functions 332 listed under other functions 330 represents the fact that the user-administrator may also be an operator, as in the sense of FIG. 6. The user-administrator may also create, modify and implement additional security features and/or network connection information 331. Finally, as with the user-operators, a user-administrator may selectively broadcast data, audio and/or video transmissions across the network to the user-operator interfaces/control panels (or even over-ride a broadcast issued by a user-operator).

Notably, the utilization or performance of any of the user-operator functions of FIG. 6 and the user-administrator functions of FIG. 8 are automatically monitored and logged by software system 50. Data related to this monitoring/logging can then be selectively or automatically exported to a legacy system, such as data storage system 20, in order to provide an inherent level of accountability and traceability to the actions taken by users of and/or elements in marking system 10. It is believed that this level of detail, unrivaled by any previously known system, will be particularly attractive to users who require audit records.

Furthermore, to the extent that the functions of FIGS. 6 and 8 are implemented over a computerized network, software control system permits a marking system to be decentralized. That is, the user-operators and/or user-administrators need not be physically proximate to the machines 12, 14 which constitute the system. Consequently, software system 50 is expected to improve and make more efficient disparate marking systems by standardizing access and control, as well as linking together heretofore incompatible machines or processes.

The functions and controls described in FIGS. 6 and 8 are, by and large, data processing steps. As such, these steps are most closely associated with the information processing requests 120 referenced in FIG. 4, although it should be understood that the data processing steps might also inherently include interaction with the reading or marking machines (as reflected in FIG. 4 by virtue of the fact that information processing requests 120 can generated internally routed outputs to the machine interaction requests 130). As mentioned previously, all of the Figures—and especially FIGS. 4, 6 and 8—are presented to further assist a programmer in drawing upon her/his experience to implement the unique aspects of this invention.

In direct contrast to previously known systems, the present invention implements the functions mentioned above through a single software system 50. As such, those in the automated marking field will readily identify the invention as a significant improvement over prior techniques. In particular, the present invention provides a single integrated system, capable of incorporating virtually any marking machine, without the need for multiple layers of interfaces, computer connections or separated networks.

I claim:

1. A system for selectively controlling operation of a means for reading or marking encoded information on an article, the system comprising:
   means for identifying an input provided by the means for reading or marking;
   data processing means for processing the input so as to generate a desired output, said means having an information processing request protocol, a machine interaction protocol and system integrity verification protocol;
   control means for controlling operation of the means for reading or marking in a manner that is responsive to at least one selected from the group consisting of: the input and the output; and
   means for selectively generating and retrieving historical records related to the performance of the system.

2. The system according to claim 1 further comprising a database capable of selectively incorporating at least one subset of information selected from the group consisting of: the historical records and the output generated by the data processing means.

3. The system according to claim 1 wherein the data processing means receives a series of inputs from a plurality of sources, and further comprising a database capable of selectively providing additional inputs for the means for processing.

4. The system according to claim 3 further comprising data storage means for tracking at least one item selected from the group consisting of: the historical records and the output.

5. The system according to claim 4 wherein the data storage means comprises an external legacy system.

6. The system according to claim 1 further comprising means for selectively verifying and updating system integrity.

7. The system according to claim 1 wherein the means for reading or marking encoded information includes at least one machine selected from the group consisting of: a laser, an ink jet, a micro mill, a pin marker, an etch machine, a printer, a thermal printer, a vision board, a fixed vision camera and an image scanner.

8. The system according to claim 7 further comprising a database capable of selectively incorporating at least one subset of information selected from the group consisting of: the historical records and the output generated by the data processing means.

9. The system according to claim 7 wherein the data processing means receives a series of inputs from a plurality of sources, and further comprising a database capable of selectively providing additional inputs for the means for processing.

10. The system according to claim 9 further comprising data storage means for tracking at least one item selected from the group consisting of: the historical records and the output.

11. The system according to claim 1 wherein the encoded information includes at least one item selected from the group consisting of: alphabetic characters, numeric characters, a linear bar code, a two-dimensional bar code and a two-dimensional matrix.

12. A software system for integrating and controlling the operation of a vision/marking system, said vision or marking system having a plurality of machines for reading or marking encoded information on an article, said software system comprising:
   means for selectively linking all of the machines in the vision/marking system to at least one user interface;
   means for identifying an input originating from at least one source selected from the group consisting of: the user interface arid at least one machine in the vision/marking system;

data processing means for processing the input so as to generate a desired output; said means having an information processing request protocol, a machine interaction protocol and system integrity verification protocol; and control means for selectively operating at least a portion of the vision/marking system in a manner that is responsive to at least one selected from the group consisting of: the input and the output, said control means being operatively implemented by the means for selectively linking the machines.

13. The software system according to claim 12 wherein the data processing means receives a series of inputs from a plurality of sources, and the software system further comprising a database capable of selectively providing additional inputs for the means for processing.

14. The software system according to claim 12 further comprising means for selectively generating and retrieving data related to the marking system.

15. The software system according to claim 12 wherein the user interface further comprises an administrative control for governing actions taken a user of the vision/marking system.

16. The software system according to claim 15 wherein the user interface further comprises a plurality of operator control panels and wherein the plurality of operator control panels are created and modified by the administrative control means.

17. The software system according to claim 12 wherein the means for linking comprises at least one selected from the group consisting of: a local area network, a wide area network and a network implemented via internet or worldwide web access.

18. The software system according to claim 17 wherein the user interface comprises a plurality of control panels and wherein a user may selectively broadcast data to at least one of the control panels.

19. The software system according to claim 12 wherein at least one vision machine and at least one marking machine are included in the vision/marking system.

20. The software system according to claim 12 wherein the vision/marking system further comprises data storage means for selectively recording and retrieving information, said information relating to at least one set of operational parameters selected from the group consisting of: the encoded information on the article, the inputs provided to the means for identifying, the outputs generated by the data processing means and actions taken by the control means.

21. The software system according to claim 12 wherein the encoded information includes at least one item selected from the group consisting of: alphabetic characters, numeric characters, a linear bar code, a two-dimensional bar code and a two-dimensional matrix.

22. The software system according to claim 12 wherein the individual machines in the vision/marking system are selected from the group consisting of: a laser, an ink jet, a Micro Mill, a Pin Marker, an Etch machine, a printer, a thermal printer, a vision board, a hand-held scanner, a fixed vision camera.

23. The software system according to claim 12 wherein the user interface includes at least one function selected from the group consisting of: universal template functions, machine interaction functions, report generation functions, data manipulation functions and network functions.

* * * * *